United States Patent [19]
Witzko et al.

[11] Patent Number: 5,565,166
[45] Date of Patent: Oct. 15, 1996

[54] TUBE UNIT AND PROCESS FOR ITS FABRICATION

[76] Inventors: Richard Witzko, Sattlerstr. 1,, 85635 Hohenkirchen, Germany; Herbert Grunsteudel, Ehlheim 15a, 91723 Dittenheim, Germany

[21] Appl. No.: 421,650

[22] Filed: Apr. 13, 1995

[51] Int. Cl.$^6$ .......................... B01D 67/00; B01D 69/08; B29D 24/00
[52] U.S. Cl. .............. 264/565; 96/8; 210/321.8; 264/DIG. 48
[58] Field of Search ............... 96/8; 210/321.79, 210/321.8, 321.81, 321.89, 321.9, 500.23; 264/41, 145, 555, 563–569, DIG.48, DIG. 62

[56] References Cited

U.S. PATENT DOCUMENTS

| | | | |
|---|---|---|---|
| 3,704,223 | 11/1972 | Dietzsch et al. | 210/321.81 X |
| 3,953,566 | 4/1976 | Gore | 264/288 |
| 4,187,390 | 2/1980 | Gore | 174/102 R |
| 4,341,631 | 7/1982 | Hargitay | 210/321.9 X |
| 4,390,575 | 6/1983 | Kopp | 210/500.23 |
| 4,425,234 | 1/1984 | Reitz | 210/321.8 |
| 4,427,424 | 1/1984 | Charpin et al. | 96/8 |
| 4,781,833 | 11/1988 | Mizutani et al. | 210/321.81 |
| 4,791,966 | 12/1988 | Eilentropp | 138/154 |
| 4,911,846 | 3/1990 | Akasu et al. | 210/321.8 X |
| 5,002,666 | 3/1991 | Matsumoto et al. | 210/321.8 X |
| 5,104,535 | 4/1992 | Cote et al. | 210/321.8 |
| 5,182,019 | 1/1993 | Cote et al. | 210/321.8 |

FOREIGN PATENT DOCUMENTS

| | | |
|---|---|---|
| 0168558 | 4/1985 | European Pat. Off. . |
| 0186293 | 7/1986 | European Pat. Off. . |
| 0226373 | 6/1987 | European Pat. Off. . |
| 0526823 | 2/1993 | European Pat. Off. . |
| 7911220 | 7/1980 | Germany . |
| 2-111415 | 4/1990 | Japan ........................... 96/8 |
| 2-102714 | 4/1990 | Japan ........................... 96/8 |
| 2-258034 | 10/1990 | Japan . |
| 1538421 | 1/1979 | United Kingdom . |
| 2267655 | 12/1993 | United Kingdom . |
| WO81/02683 | 10/1981 | WIPO ........................ 210/321.81 |

*Primary Examiner*—Robert Spitzer
*Attorney, Agent, or Firm*—David J. Johns; Carol A. Lewis White

[57] ABSTRACT

Tube units useful for a variety of application are provided. Preferably, individual laminated tubes are joined to each other by intermediate pieces to produce a wide ribbon of parallel tubes. The tubes are porous to certain substances, allowing them to serve as an apparatus to exchange material between two or more fluid streams. The tubes are particularly useful as membrane modules for exchange of material between two fluids. Continuous and discontinuous methods for constructing such tube units are also taught.

7 Claims, 1 Drawing Sheet

TUBE UNIT AND PROCESS FOR ITS FABRICATION

FIELD OF THE INVENTION

The invention concerns a tube unit as well as a method of production of same.

BACKGROUND OF THE INVENTION

It is known how to employ liquid/liquid or liquid/gaseous membrane modules for material exchange systems, and tube modules which work with hollow fibers or capillary tubes have proven to be especially good. The tubes in this case are secured in liquid and gas-tight manner, preferably cast, in two face plates of a housing. A fluid involved in the material exchange, for example a gas, flows through the tubes. A bundle of fibers is arranged in a housing through which another fluid flows, for example a liquid. The efficiency of the material exchange is influenced by the flow relations, among other things. The flow can approach the tubes in the axial or radial direction.

Such modules are used, for example, for ultra-filtration and microfiltration, as well as for degasification, e.g., of organic liquids, and, more recently, for cleaning of exhaust gas. In exhaust gas cleaning and similar applications, the gas being cleaned flows through the tube membranes, for example, and a liquid flows around the outside of the tubes, said liquid having absorptive properties and being able to bind pollutants.

To improve the efficiency of the material exchange it has proven to be advantageous to employ tube membranes of PTFE, since these possess both good chemical and thermal stability and, in particular, a low surface tension and, accordingly, very good hydrophobic properties.

Known PTFE tubes are made by paste extrusion. The wall thicknesses achievable are limited by this method. It is only possible to orient the material in the lengthwise direction. Furthermore, the method is expensive and the tubes are therefore costly.

A method is known from U.S. Pat. No. 4,791,966 for production of tubes, in which a flat band of microporous, oriented PTFE, thickened in the middle in cross section, is wound in a spiral about a wire, sintered, and then pulled away from the wire. This method has a number of advantages over the first-mentioned technique. In particular, the wall thickness of the tube membranes can be varied in broad limits. Also, a material with a particular microporosity can be used from the very beginning. The drawback is, in particular, the awkward handling of the tubes when putting together the module, as well as the still quite expensive and costly fabrication of the tubes.

SUMMARY OF THE INVENTION

Given this state of the art, the purpose of the invention is to indicate a new, cost-favorable tube membrane, as well as a method for production of tube membranes in which the handling of the tubes in particular is improved and the putting together of the corresponding modules is simplified.

According to the invention, the purpose is accomplished by the features of the present invention as claimed. An important fact was the recognition of how to put together individual tube membranes into a unit which roughly corresponds to a multiple-row ribbon cable. The pieces connecting the individual tubes can be preferably pierced so that a flow is provided around the tubes in the membrane modules. Further advantageous formations of the inventive tube unit are the subject of the preferred embodiments of the present invention as claimed.

Particularly preferred is the construction of the tube unit of the present invention through a continuous process. For instance, a continuous process may be provided with the following steps:

a) joining together of two flat bands (18) in a gap between two shaping rollers (20);

b) pressing together of the flat bands (18) in the roller gap, possibly with addition of heat, during which c) wire (24) parallel to each other and spaced apart are arranged stationary in the roller gap, engaging with corresponding grooves (22) cut into the surface of the roller;

d) pulling of the laminated flat bands out of the roller gap and passage through a sinter bath or a hot air unit (26);

e) pulling of the laminated flat bands from the stationary wires (24);

f) winding or folding of the endless tube unit (10) consisting of flat bands laminated together.

BRIEF DESCRIPTION OF THE DRAWINGS

The invention is explained more closely by means of the enclosed drawing, which shows.

DETAILED DESCRIPTION OF THE INVENTION

Figure 1:
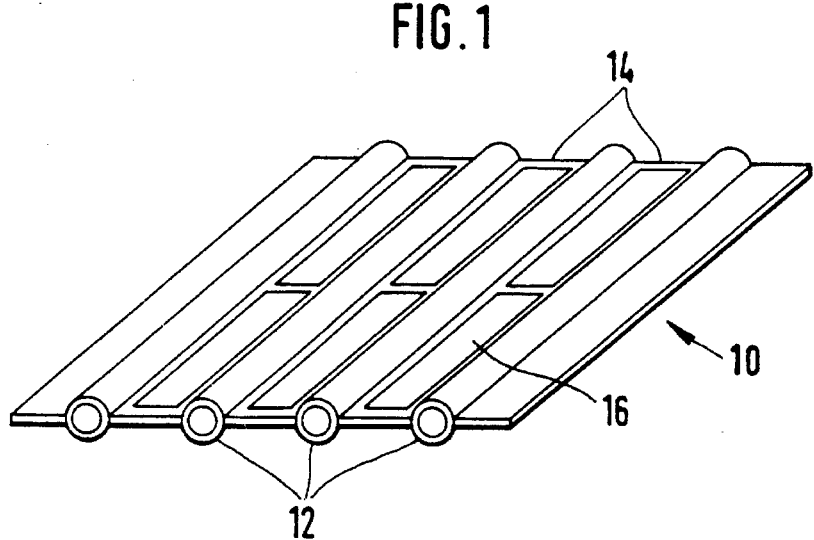
FIG. 1 is a perspective view of a piece of the tube unit of the present invention.

According to FIG. 1, the tube unit 10 of the present invention comprises of several tubes 12, arranged alongside each other in one plane, being joined together by the pieces 14. These pieces can have openings 16. Such tube units are much easier to handle than individual tubes, and they can be easily wound or folded. It is easy to assemble them into membrane modules, since several tubes can always be put in position at the same time. The pieces 14, furthermore, act as spacers, so that the tubes cannot be forced together when the module is operating.

The tube membranes comprise of two laminated layers of a microporous, oriented PTFE (polytetrafluoroethylene) membrane. A method for production of such membranes is described in, for example, U.S. Pat. Nos. 3,953,566 and 4,187,390. Thanks to the inert nature of the material and the hydrophobic surface, this material is exceptionally suitable for a number of material exchange systems. Preferably, the material is stretched along one or two axes prior to the production of the tubes, so that it becomes permeable to gas from the resulting microporosity, yet remains liquid-tight. In order to seal up possible flaws of the membrane, the tubes can also include several membrane layers, laminated one on top of the other. One or more of the membrane layers can be coated either with a gas-selective coating, for example, or by one or more layers of another material, for example, a reinforcement in the form of a fiberglass wool or a textile, or filled with inorganic or organic materials like activated charcoal. A gas-selective coating may consist, for example, of massive FEP (fluoroethylenepropylene), PFA, or NAFION®:

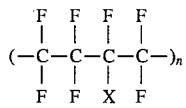

where x=SO$_3$H or COOH.

The membrane layers can also exhibit varying pore structures, such as (for example) a large-pore outer layer, with preferably 0.1–10 μm, and a small-pore inner layer, with preferably 0.01–0.1 μm pore diameter. The inner diameter of the tubes is preferably 0.1–2 mm.

Figure 2:
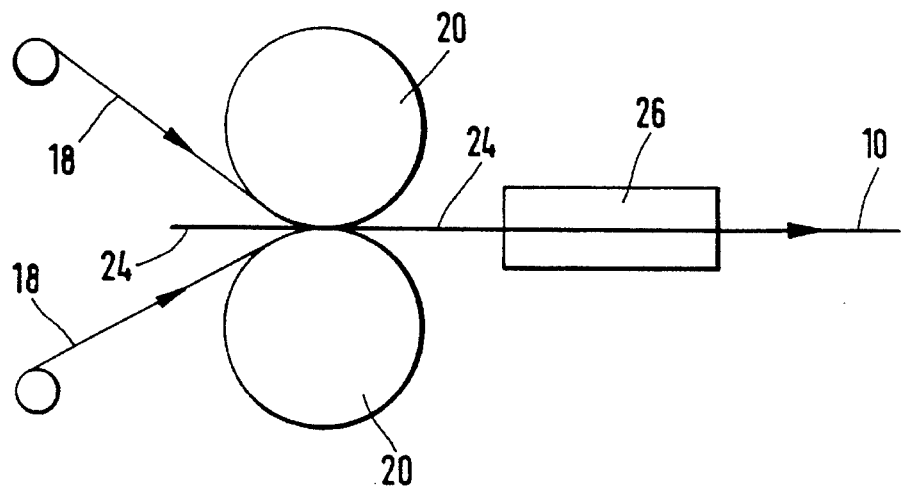
FIG. 2 is a schematic representation of a device for implementing the production method of the present invention.
Figure 3:
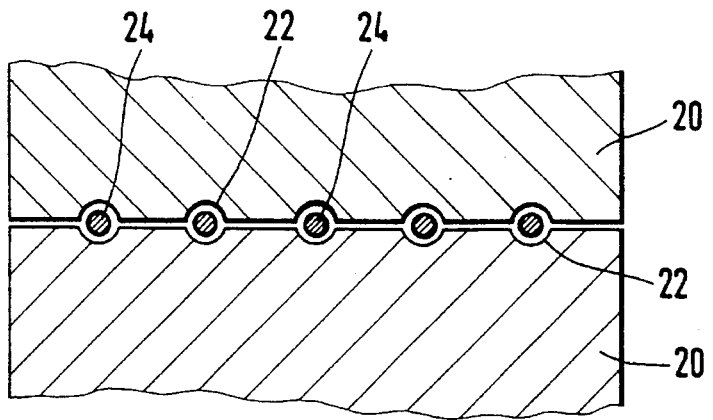
FIG. 3 is a cross-section view through a gap between two shaping rollers of the device per FIG. 2.

The tube unit shown in FIG. 1 can be produced in a device that is shown schematically in FIG. 2. Two flat bands 18 of a microporous, oriented PTFE membrane are introduced into the gap between two shaping rollers 20. Grooves 22 (shown in FIG. 3) are cut into the surface of the shaping rollers 20, lying opposite each other, so that cavities with round cross section are formed, in which wires or mandrels 24 are arranged in stationary manner. The wires 24 have an outer diameter that is slightly smaller than the inner diameter of the cavity formed by the grooves 22.

The two flat bands 18 are drawn through the roller gap, becoming laminated together and laid around the wires 24 arranged in the region of the grooves 22, so that the tubes 12 are formed. The bands are joined by means of the pressure produced by the shaping rollers 20. The rollers are tightened with the torque wrench so that the space remaining between the rollers corresponds to the wall thickness of the tube membranes. In addition, one or more familiar bonding technologies, such as gluing, heat or laser radiation, can be used. Thus, for example, glue applicator rolls can be placed in front of the shaping rollers 20. The bands 18 can be heated either during their stay in the roller gap or after exiting from it. For this, either the shaping rollers, and/or the wires 24 can be heated or the bands can be conducted through a sintering bath or a hot air unit 26. In this unit, the surface of the laminated membranes is melted and secured in this way. A dwell time of 2–3 seconds at a temperature of 350°–400° C. in the sintering bath is preferable.

The stripping off of the laminated flat bands from the wires 24 is done either upstream or downstream of the sintering station 26. The latter has the advantage of reliably preventing a collapsing of the tubes during the heat treatment.

The tube unit in the form of an endless band can then be wound in a spiral or folded and is available for further processing in the manufacture of the corresponding membrane modules.

However, the band can also be cut into pieces and the individual end segments arranged in parallel and at a spacing from each other in the module.

A fluid or solid can be conducted between the bands as the two flat bands are joined together. Thus, it is possible to produce a tube unit in a simple and economical way, in which the tubes are immediately filled and do not have to be filled later on.

Of course, the invention is not confined to the PTFE membranes, mentioned here as being preferable, but rather other microporous polymer materials such as polyethylene and polypropylene can be used. It is not absolutely necessary that the polymer materials be porous. For example, polycarbonate and polyethylene exist in both porous and nonporous form, while FEP is generally not porous. However, all these materials can be used in connection with the invention.

The size relationships of the tubes mentioned here are only one particular embodiment of the inventive tube unit. Of course, the tubes can also have a larger or smaller diameter, depending on their intended use. If it should be needed for a different application, it is also possible to again cut up the tube unit into individual membrane tubes.

Besides the continuous method described, the inventive tube unit can also be produced discontinuously, by placing a flat band in an essentially flat tool, provided with several parallel semicircular recesses with a spacing between them, and furthermore wires are placed in the hollows created in this way on the flat band, and finally a second flat band and a second correspondingly shaped element of the tool are placed on this arrangement. By applying pressure (5–500 N/cm$^2$, preferably 10–100 N/cm$^2$) and temperature (300°–400° C.) over a period of 2–100 seconds (depending on the material and temperature), the bands are pressed together at the pieces lying between the recesses and joined in this way. The bands are then sliced and the wires removed, producing a tube unit in flat form. The tool would basically correspond to that in FIG. 3.

The inventive tube unit can be used advantageously for supplying gas to sludge ponds, swimming pools or fermenters in biochemistry by the use of one or more such tube unit. In this case, the tube units are placed on the bottom of the basin. Gas (e.g., air, oxygen, or ozone) is blown through the tubes with such pressure that the gas is blown into the sludge in the form of extremely tiny bubbles. In the basin, aerobic microorganisms are usually employed, which require oxygen in order to live. Therefore, the more finely the air (for example) is distributed, the more effective the oxygen supply. At present, rubber tubes are still being used and the air bubbles produced by them are relatively large. Furthermore, the tubes must be water-tight, for otherwise check valves would be necessary. It is also conceivable to design the tubes so that the lower layer consists of rubber or thermoplastic (such as polypropylene or PVC) and only the upper layer consists of microporous or other porous material. The two layers are joined by glue or move across a heated roller, which melts the surface of the thermoplastic.

As an alternative, it is possible to install modules with a high packing density of tube units in a container filled with liquid. The gas is then conducted through the tubes with such pressure that the gas diffuses through the walls of the tubes (i.e., no bubbles are formed). This is then taken up from the liquid, e.g., by physical absorption.

A further use of the tube unit produced by the method lies in the field of chemical reactors. Thus, for example, it is possible to conduct a solution inside the tubes, which takes up a substance, for example, in gas form in a first module and surrenders, for example, a gaseous reaction product to a fluid in a second, subsequent module. In a third, subsequent module, another substance is taken up, and so on. Since the modules are connected one after the other, a continuous reaction occurs. Each module can be controlled separately and thus is used only when necessary.

It is also possible to employ the tube unit for concentration of, for example, flushing solutions from a galvanic process. The solution being concentrated is conducted through the tubes, while a gas is conducted past the tube membranes. The solvent evaporates completely or partially and the concentrated substances remaining in the tubes can be again supplied to the reaction process.

Finally, the inventive tube unit can also be used advantageously in articles of clothing, either individually or in layers. It would serve as a kind of spacer and improve the water vapor permeability of the garment. The water vapor would diffuse from the body side through the walls of the tubes into their interior (partial pressure gradient caused by differences in concentration, pressure or temperature). From there, the water vapor would be pulled by convection through the walls of the tubes to the outside of the garment. This would have the advantage of transporting the water vapor away from the body.

We claim:

1. A continuous method for production of a tube unit that comprises:

(a) joining together of two flat bands in a gap between two shaping members;

(b) pressing together of the flat bands in the gap between the members, during which (c) wires parallel to each other and spaced at a distance are arranged in the gap, engaging with corresponding grooves cut into the surface of the member;

(d) removing the laminated flat bands from the wires to provide laminated flat bands.

2. Method of claim 1, that further comprises conducting a fluid or solid between the bands while they are being joined together.

3. Method of claim 1, that further comprises cutting the tube unit into individual tubes modules.

4. Method of claim 1 that further comprises providing as the flat bands an oriented, microporous PTFE membrane.

5. Method of claim 1, that further comprises providing several adjacent layers of flat bands laminated together.

6. The method of claim 1 that further comprises winding laminated flat bands following removal from the wires.

7. A discontinuous method for production of a tube unit that comprises:

a) inserting a first flat band into a first, substantially planar tool having at least one semicircular recess;

b) inserting wires into hollows created on the flat band by the semicircular recess;

c) emplacing a second flat band and a second corresponding tool;

d) applying pressure and temperature over a period sufficient for the areas of the flat bands lying between the recesses to join together to form a laminate; and e) removing the wires from the laminate.

* * * * *